US012436121B2

(12) United States Patent
Saito

(10) Patent No.: US 12,436,121 B2
(45) Date of Patent: Oct. 7, 2025

(54) X-RAY FLUORESCENCE ANALYSIS DEVICE

(71) Applicant: SHIMADZU CORPORATION, Kyoto (JP)

(72) Inventor: Yuta Saito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 341 days.

(21) Appl. No.: 18/274,617

(22) PCT Filed: Jul. 29, 2021

(86) PCT No.: PCT/JP2021/028103
§ 371 (c)(1),
(2) Date: Jul. 27, 2023

(87) PCT Pub. No.: WO2022/162975
PCT Pub. Date: Aug. 4, 2022

(65) Prior Publication Data
US 2024/0085353 A1 Mar. 14, 2024

(30) Foreign Application Priority Data

Jan. 27, 2021 (JP) ................. 2021-010813

(51) Int. Cl.
*G01N 23/223* (2006.01)
*G01T 1/17* (2006.01)
(Continued)

(52) U.S. Cl.
CPC ............ *G01N 23/223* (2013.01); *G01T 1/17* (2013.01); *G01N 2223/076* (2013.01);
(Continued)

(58) Field of Classification Search
None
See application file for complete search history.

(56) References Cited

U.S. PATENT DOCUMENTS 6,563,902 B2 * 5/2003 Takahashi ............ G01N 23/223
378/115
8,618,471 B2 * 12/2013 Steadman ................ G01T 1/17
250/252.1
(Continued)

FOREIGN PATENT DOCUMENTS

CN 108562603 A 9/2018
JP 5468902 B2 * 4/2014 ............... G01T 1/17
(Continued)

OTHER PUBLICATIONS

Written Opinion of the International Searching Authority for PCT application No. PCT/JP2021/028103 dated Oct. 19, 2021.
(Continued)

*Primary Examiner* — Thomas R Artman
(74) *Attorney, Agent, or Firm* — Muir Patent Law, PLLC

(57) ABSTRACT

Provided is an X-ray fluorescence analyzer capable of performing an analysis under more favorable conditions depending on an analysis target. The X-ray fluorescence analyzer includes a detector 30, preamplifiers 41A, 41B configured to amplify a detection signal from the detector into a staircase wave signal at different signal amplification factors $G_A$, $G_B$, a differentiating circuit 42 configured to convert the staircase wave signal into a differential wave signal, an A/D converter 43 configured to convert the differential wave digital signal to a digital signal, a signal processing unit 160 configured to detect a peak value from the digital signal, discriminate and count the peak value, and generate a histogram, and an input unit 51 configured to set the energy range of the fluorescent X-rays to be analyzed. Any one of the preamplifiers is automatically selected based on maximum energy in the set energy range.

2 Claims, 4 Drawing Sheets

(51) Int. Cl.
*G01T 1/24* (2006.01)
*G01T 1/36* (2006.01)

(52) U.S. Cl.
CPC ............... *G01N 2223/1016* (2013.01); *G01N 2223/304* (2013.01); *G01T 1/247* (2013.01); *G01T 1/366* (2013.01)

(56) References Cited

U.S. PATENT DOCUMENTS

| | | | | |
|---|---|---|---|---|
| 9,128,195 | B2* | 9/2015 | Soh | ............................ H04N 5/32 |
| 9,213,108 | B2* | 12/2015 | Nagai | ..................... H04N 23/30 |
| 9,778,214 | B2* | 10/2017 | Sako | .......................... G01T 1/40 |
| 10,267,932 | B2* | 4/2019 | Battyani | .............. G01N 23/223 |
| 10,976,271 | B2* | 4/2021 | Morton | ............ G01N 23/20083 |
| 11,415,710 | B2* | 8/2022 | Battyani | .................... G01T 1/17 |
| 2002/0009177 | A1* | 1/2002 | Takahashi | ............. G01N 23/223 |
| | | | | 378/45 |
| 2010/0086100 | A1* | 4/2010 | Steadman | ................. G01T 1/17 |
| | | | | 378/19 |
| 2013/0256547 | A1* | 10/2013 | Soh | ........................... G01T 1/17 |
| | | | | 250/371 |
| 2013/0287175 | A1* | 10/2013 | Nagai | ..................... G01T 1/247 |
| | | | | 250/336.1 |
| 2017/0184519 | A1* | 6/2017 | Sako | ......................... G01T 1/17 |
| 2017/0227661 | A1* | 8/2017 | Battyani | ................. G01T 7/005 |
| 2017/0276803 | A1 | 9/2017 | Battyani et al. | |
| 2020/0378906 | A1* | 12/2020 | Morton | .................. G01V 5/222 |
| 2020/0378907 | A1* | 12/2020 | Morton | .................. G01V 5/226 |
| 2023/0251215 | A1* | 8/2023 | Saito | ..................... G01N 23/223 |
| | | | | 702/22 |
| 2024/0085353 | A1* | 3/2024 | Saito | ....................... G01T 1/247 |

FOREIGN PATENT DOCUMENTS

| | | |
|---|---|---|
| JP | 2015-021957 A | 2/2015 |
| JP | 2020-051900 A | 4/2020 |

OTHER PUBLICATIONS

1 Extended European Search Report dated Nov. 6, 2024 for the European Patent Application No. 21922983.8.

* cited by examiner

page 1

X-RAY FLUORESCENCE ANALYSIS DEVICE

The present invention relates to an energy dispersive type X-ray fluorescence analyzer, and more particularly to a fluorescence X-ray device capable of setting an energy range of fluorescent X-rays to be analyzed.

BACKGROUND ART

An X-ray fluorescence analyzer irradiates a solid sample, a powder sample, or a liquid sample with excitation X-rays (primary X-rays) and detects fluorescent X-rays emitted by being excited by irradiated primary X-rays with a spectrometer to perform a qualitative or quantitative analysis of the element contained in the sample. There are two types of X-ray fluorescence analyzers with different measurement principles, i.e., a wavelength-dispersive type X-ray fluorescence analyzer and an energy-dispersive type X-ray fluorescence analyzer.

Among them, the energy-dispersive type X-ray fluorescence analyzer has a configuration in which fluorescent X-rays are directly detected by a semiconductor detector or the like, and the output signal is subsequently processed to separate each X-ray energy E (wavelength $\lambda$) (see, for example, Patent Documents 1 and 2).

FIG. 4 is a schematic configuration diagram showing a configuration of a conventional energy-dispersive type X-ray fluorescence analyzer. The X-ray fluorescence analyzer 101 is provided with an X-ray tube 10, an energy dispersive type spectrometer 30 (also referred to as "detector 30"), a preamplifier 41, a differentiating circuit 42 composed of a capacitor C and a resistor R, an A/D converter 43, a signal processing unit 160 for performing digital signal processing, the signal processing unit being composed of a waveform conversion digital filter 61, a peak detection unit 62, and a histogram memory 63, and a CPU 150 for controlling the X-ray tube 10, the energy dispersive type spectrometer 30, the signal processing unit 160, and the like. The CPU 150 is connected to an input unit 151 for inputting settings, commands, etc., necessary for an analysis.

The X-ray tube 10 is configured to emit primary X-rays generated at an end surface of a target to a sample S by applying a high voltage to the target and a low voltage to a filament to cause hot electrons emitted from the filament to collide with the end surface of the target.

The detector 30 has a detection element (e.g., lithium drift type Si semiconductor detector) inside the housing, the detection element being configured to detect fluorescent X-rays. When fluorescent X-rays emitted from the sample S by being irradiated with primary X-rays are incident on the detection element, the fluorescent X-rays are converted into an amount of charge proportional to the energy of the fluorescent X-rays and then detected. The amount of charge detected by the detector 30 is sent to the preamplifier 41, amplified, converted into a voltage signal, and output. The output voltage signal is in the form of a staircase wave in which each step of the staircase wave detects one fluorescent X-ray (quantum), and the height (wave height) of each step represents the X-ray energy E (wavelength $\lambda$).

The output signal amplified by the preamplifier 41 is sent to the differentiating circuit 42. The differentiating circuit 42 converts the staircase wave into a differential wave represented by the following Formula (1). By converting from the staircase wave to the differential wave as described above, a wider dynamic range can be ensured as compared with with the staircase wave, and higher resolution can be achieved.

$$y = \exp(-nT/\tau) = a^n \qquad (1)$$

where "$\tau$" is a RC time constant, "T" is a sampling period, "n" is a number of samples, and "a" is a time constant $(\exp(-T/\tau))$.

The A/D converter 43 converts the differential wave input as an analog signal into a differential wave digital signal and inputs it to the waveform conversion digital filter 61 in the signal processing unit 160.

The waveform conversion digital filter 61 converts the input differential wave digital signal into a trapezoidal wave digital signal by processing it using the transfer function shown in the following Formula (2), as shown in FIG. 5. By converting the differential wave digital signal into the trapezoidal wave digital signal as described above, the peak value (peak top value) of the peak can be accurately calculated.

$$h(z) = \frac{1 - az^{-1}}{1 - 2z^{-1} + z^{-2}} \left\{ \frac{1 - z^{-N} - z^{-(N+M)} + z^{-(2^*N+M)}}{N} \right\} \qquad (2)$$

In the above-described Formula, "M" is a trapezoidal wave top time (time of the upper segment), and "N" is a trapezoidal wave rise/fall time.

In the above-described Formula, FIG. 6 is a schematic waveform diagram showing the differential wave digital signal input to the waveform conversion digital filter 61 and the trapezoidal waveform digital signal output after being waveform-converted by the waveform conversion digital filter 61. When signals of various sizes are detected at irregular time intervals by the detector 30, differential wave digital signals of various sizes are input one after another at irregular time intervals to the waveform conversion digital filter 61 via the preamplifier 41, the differentiating circuit 42, and the A/D converter 43, and are processed with digital signals to produce a trapezoidal waveform digital signal with a peak value corresponding to each differential digital signal.

The peak detection unit 62 detects the peak of the trapezoidal wave digital signal to obtain the peak value of the peak (peak top value), and increments the count value of the X-ray energy E corresponding to the peak top value each time one peak is detected, and stores it in the histogram memory 63.

On the other hand, the energy range of the fluorescent X-rays to be analyzed is set in advance from the input unit 151. Based on the data stored in the histogram memory 63, the CPU 150 generates a wave height distribution diagram (energy spectrum histogram) with the horizontal axis as the energy range of fluorescent X-rays set from the input unit 151 and the vertical axis as the content (intensity) of elements obtained from the counts, and displays it on the display screen (not shown).

PRIOR ART DOCUMENTS

Patent Documents

Patent Document 1: Japanese Unexamined Patent Application Publication No. 2015-21957
Patent Document 2: Japanese Unexamined Patent Application Publication No. 2020-51900

SUMMARY OF THE INVENTION

Problems to be Solved by the Invention

In a fluorescent X-ray analysis, depending on the analysis target, there is a case in which fluorescent X-rays with a small energy range are analyzed, or a case in which fluorescent X-rays with a large energy range are analyzed. For this reason, the energy dispersive type X-ray fluorescence analyzer 101 is configured such that the energy range (measurement range) in which the analysis is performed can be set during the analysis. Specifically, it is configured to set such that either the energy range of 0-20 eV or the energy range of 0-40 eV can be selected by the switching operation of the measurement range by the input unit 151 (e.g., the input screen displaying switch buttons).

On the other hand, the same configuration is used for each part from the preamplifier 41 to the signal processing unit 160, which processes the signal detected by the detector 30 regardless of the X-ray energy range to be analyzed. The signal amplification factor G (gain G) of the preamplifier 41 is always set to the same value regardless of the X-ray energy range to be analyzed, specifically, the signal amplification factor G is set to "1×."

The voltage signal amplified by the preamplifier 41 at the signal amplification factor G is converted into a differential wave by the differentiating circuit 42 and input to the A/D converter 43. When the signal amplification factor G of the preamplifier 41 is set to a large value (e.g., "2×"), the amount of change in the voltage signal input to the A/D converter 43 will become larger, which will improve the measurement sensitivity.

However, since the input voltage of the A/D converter 43 has an upper limit voltage value that can be taken in, when a voltage signal exceeding the maximum input voltage is input, the signal cannot be taken in due to saturation.

FIG. 7 is a waveform diagram schematically showing the output voltage signal (staircase wave) of the preamplifier 41 when fluorescent X-rays are incident on the detector 30 one after the another and the voltage signal (differential wave) input to the A/D converter 43. For the purpose of improving the measurement sensitivity, the signal amplification factor G of the preamplifier 41 is set to the larger value "×2." (a) of FIG. 7 shows the case when many fluorescent X-rays with small X-ray energy are incident, and (b) of FIG. 7 shows the case when many fluorescent X-rays with large X-ray energy are incident and saturated.

In a case where fluorescent X-rays with small X-ray energy are incident, the wave height of each individual staircase wave is small and the voltage change across the staircase wave is also small, so the differential wave signal input to the A/D converter 43 does saturate by exceeding the maximum input voltage (see (a) of FIG. 7).

On the other hand, in a case where fluorescent X-rays with high X-ray energy are incident, staircase waves with large wave heights are generated one after another, resulting in large changes in the overall staircase wave voltage, which increases the differential wave signal corresponding thereto. For this reason, when the signal amplification factor G of the preamplifier 41 is set to a large value, the A/D converter 43 will eventually saturate by exceeding the maximum input voltage ((b) of FIG. 7).

For this reason, the signal amplification factor G is set to a smaller signal amplification factor G value ("1×") such that the A/D converter 43 does not saturate even when performing an X-ray fluorescence analysis with large X-ray energy. Therefore, in an analysis within a smaller X-ray energy range, the S/N ratio cannot be increased, therefore it was difficult to perform an analysis with sufficient resolution.

Therefore, the purpose of the present invention is to provide an X-ray fluorescence analyzer capable of performing an analysis under more favorable conditions depending on an analysis target.

Means for Solving the Problems

An X-ray fluorescence analyzer according to the present invention made to solve the above-described problems, includes:
 a detector configured to detect fluorescent X-rays emitted from a sample irradiated with excitation X-rays;
 preamplifiers each configured to amplify a detection signal from the detector into a staircase wave signal; and
 a differentiating circuit configured to convert the staircase wave signal into a differential wave signal;
 an A/D converter configured to convert the differential wave signal into a digital signal;
 a signal processing unit configured to detect a peak value from the digital signal, discriminate and count the peak value, and generate a histogram; and
 an input unit configured to set an energy range of fluorescent X-rays to be analyzed,
 wherein an energy spectrum in the set energy range is generated based on the histogram,
 wherein the preamplifiers are different in an amplification factor and arranged in a switchable manner, and
 wherein any one of the preamplifiers is automatically selected based on maximum energy in the set energy range.

Here, the maximum energy in the set energy range of the fluorescent X-rays may include 40 KeV and 20 KeV.

Effects of the Invention

According to the X-ray fluorescence analyzer of the present invention, the energy range of fluorescent X-rays to be analyzed is set by the input unit. When the energy range of fluorescent X-rays to be analyzed is small, the energy of the X-rays incident one after another is about several KeV, and even if the signal amplification factor (gain) of the preamplifier is set to a large value, the differential wave signal sent to the A/D converter will not exceed the maximum input voltage of the A/D converter, allowing stable measurement.

On the other hand, when the energy range of fluorescent X-rays to be analyzed is large, the energy of the X-rays incident one after another may be large (e.g., Kα ray of Rh, Kα ray of Sn, etc.), and when the signal amplification factor of the preamplifier is set to a large value, the differential wave signal exceeds the maximum input voltage of the A/D converter and becomes a saturate state, which may result in a case in which the signal cannot be analyzed.

Therefore, a plurality of preamplifiers with different signal amplification factors is provided in a switchable manner, and the maximum energy included in the set energy range of fluorescent X-rays is read out according to the energy range of the input setting when conducting an analysis, and based on this value, the preamplifier with a larger signal amplification factor between the preamplifiers with the signal amplification factor capable of being used within the range not exceeding the maximum input voltage of the A/D converter is automatically selected.

With this, when an analysis involving fluorescent X-rays with larger X-ray energy is performed, the A/D converter can be prevented from being saturated, and when an analysis involving fluorescent X-rays with low X-ray energy is performed, it is possible to perform the analysis under conditions where the resolution is improved by setting a large signal amplification factor to improve the S/N ratio. For the measurer, by simply setting the energy range of the fluorescent X-rays to be analyzed, it is automatically switched to a preamplifier with a signal amplification factor suitable for the analysis, eliminating an additional setup operation.

Here, the maximum energy of the fluorescence X-ray energy range to be set may include 40 KeV and 20 KeV. Specifically, for example, the input unit may set to 0-20 eV and 0-40 eV as the X-ray energy range to be analyzed.

EMBODIMENTS FOR CARRYING OUT THE INVENTION

Hereinafter, embodiments of the present invention will be described with reference to the drawings. Note that the present invention is not limited to the embodiments described below but includes various embodiments to the extent that they do not depart from the gist of the present invention.

Figure 1:
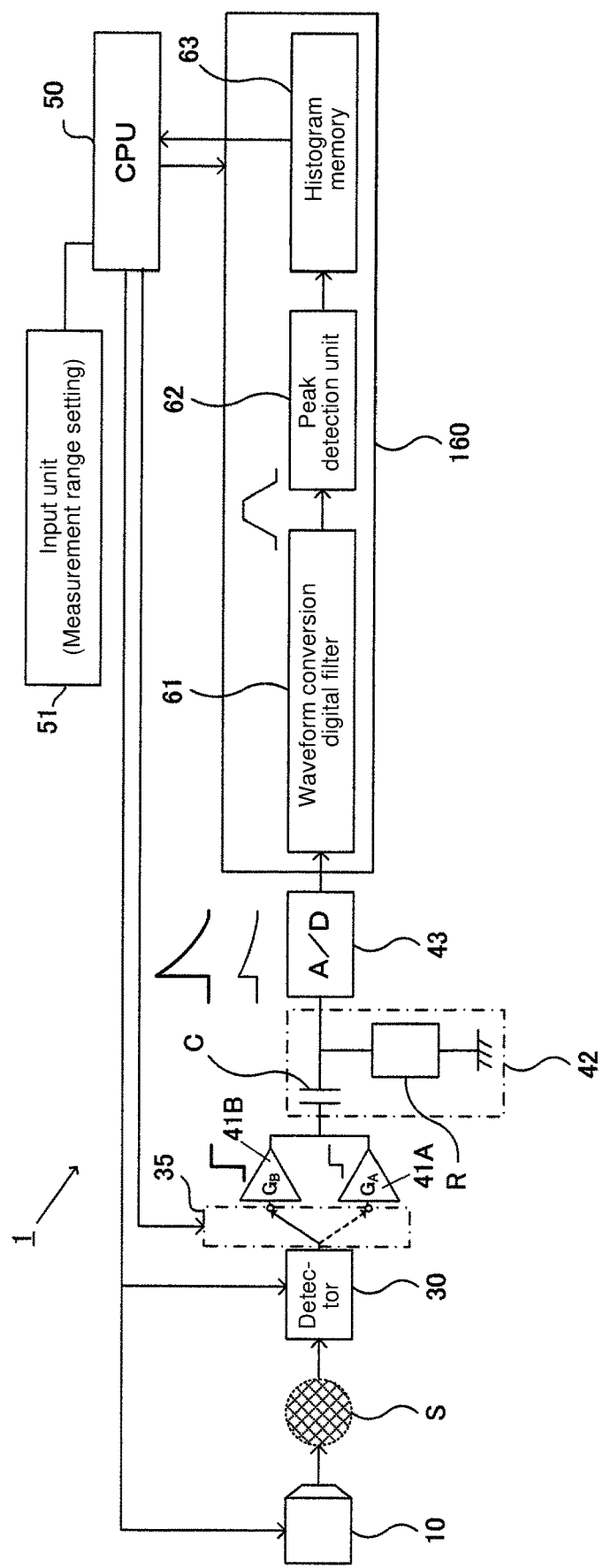
FIG. 1 is a schematic configuration diagram showing a conventional energy-dispersive type X-ray fluorescence analyzer according to one embodiment of the present invention.

FIG. 1 is a diagram showing a schematic configuration of an energy-dispersive type X-ray fluorescence analyzer which is one embodiment of the present invention.

The X-ray fluorescence analyzer 1 is provided with an X-ray tube 10, an energy dispersive type spectrometer 30 (also referred to as "detector 30"), a switch 35, preamplifiers 41A and 41B, a differentiating circuit 42 composed of a capacitor C and a resistor R, an A/D converter 43, a signal processing unit 160 for performing digital signal processing, the signal processing unit being composed of a waveform conversion digital filter 61, a peak detection unit 62, and a histogram memory 63, and a CPU 50 for controlling the X-ray tube 10, the energy dispersive type spectrometer 30, the signal processing unit 160, and the like. The CPU 50 is connected to an input unit 51 for inputting settings, commands, etc., necessary for analysis.

Figure 4:
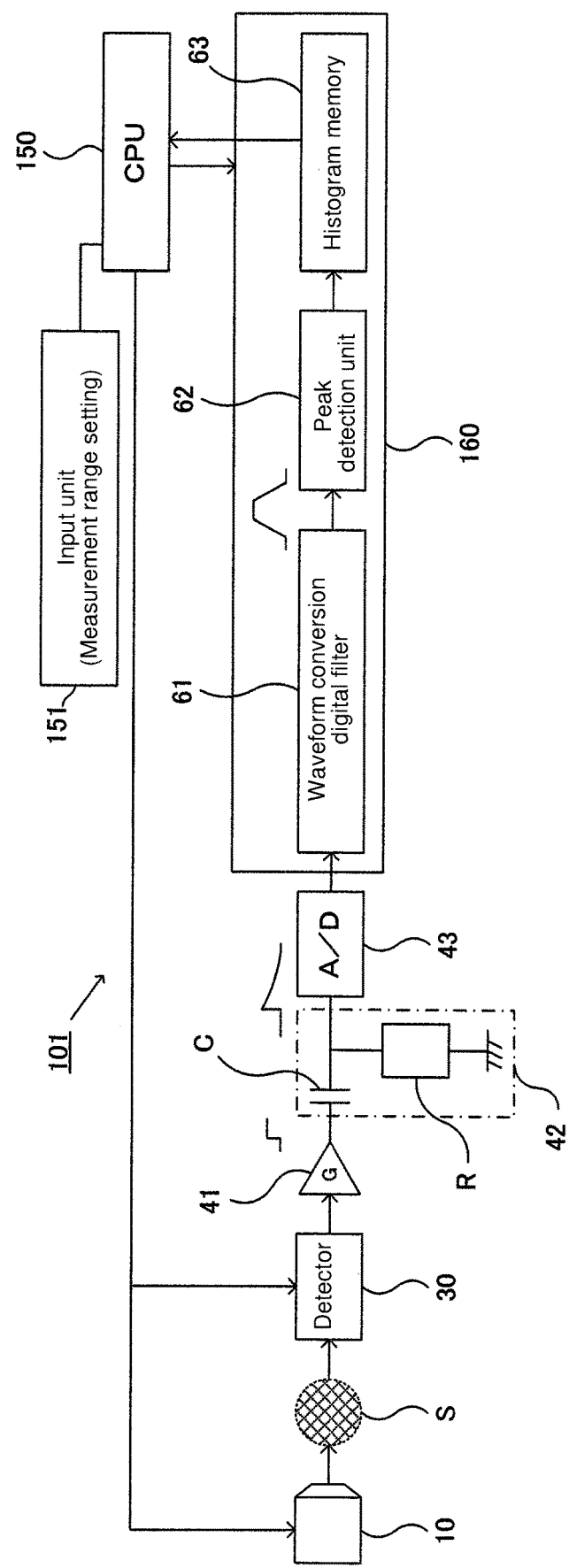
FIG. 4 is a schematic configuration diagram showing a conventional energy-dispersive type X-ray fluorescence analyzer.
Figure 5:
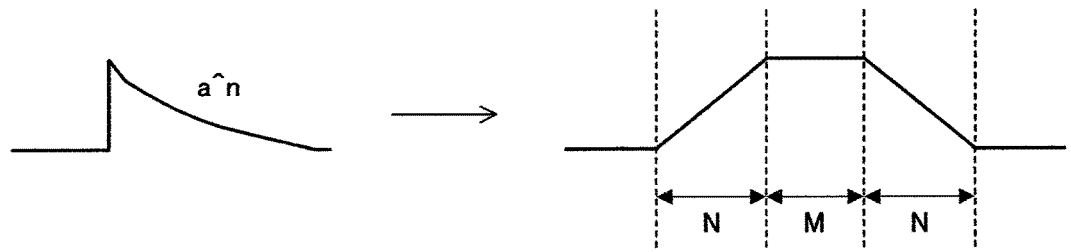
FIG. 5 is a diagram explaining the relation between a differential wave and a trapezoidal wave converted from the differential wave.
Figure 6:
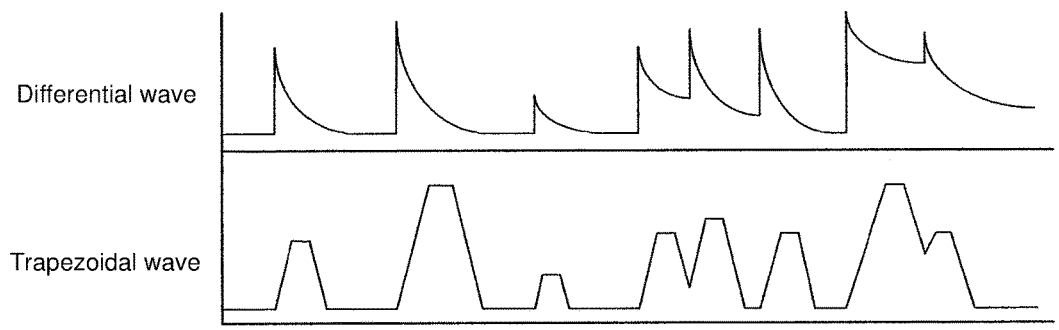
FIG. 6 is a waveform diagram schematically showing a differential wave digital signals input to the digital filter one after another and the trapezoidal waveform digital signals output after waveform conversion (digital processing).
Figure 7:
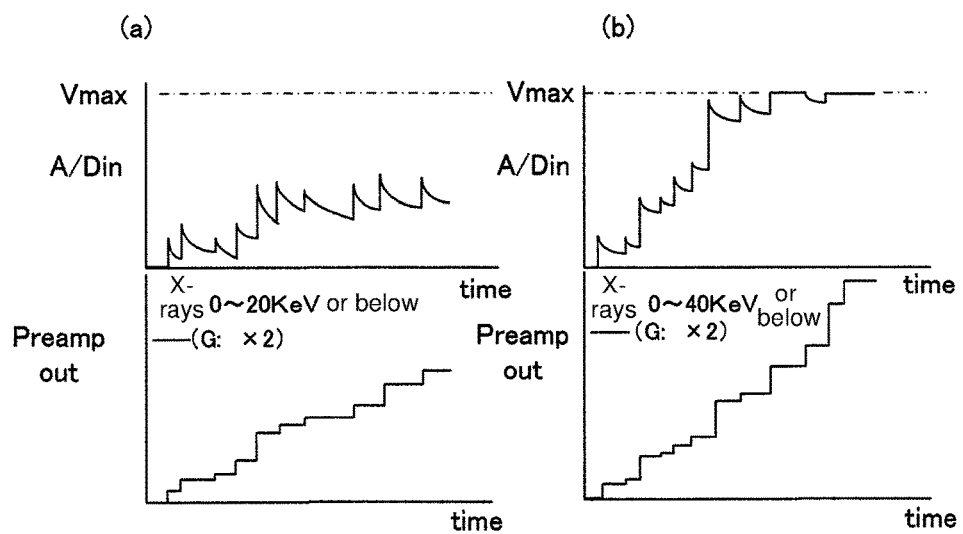
FIG. 7 is a waveform diagram schematically showing an output voltage signal (staircase wave) of the preamplifier (signal amplification factor G is "×2") and a voltage signal (differential wave) input to the A/D converter. (a) shows a case in which a number of fluorescent X-rays with small X-ray energy is incident, and (b) shows a case in which a number of fluorescent X-rays with large X-ray energy is incident and saturated.

In this X-ray fluorescence analyzer 1, some of explanations will be omitted by adding the same reference symbol for the same configuration as in the conventional energy-dispersive type X-ray fluorescence analyzer 101 described with reference to FIG. 4.

In the X-ray fluorescence analyzer 1, two preamplifiers 41A and 41B with different signal amplification factors (gains) are connected in parallel across a switch 35 on the output side of the detector 30.

The signal amplification factor $G_A$ of the preamplifier 41A is set to a signal amplification factor that will not cause the A/D converter 43 to saturate even when analyzing up to the maximum energy that can be measured by the X-ray fluorescence analyzer 1 (e.g., 40 KeV). This signal amplification factor is the same value as the signal amplification factor set in the preamplifier 41 of the conventional X-ray fluorescence analyzer 101 (FIG. 4), and therefore, when an analysis is performed using the preamplifier 41A, the measurement can be performed with the same resolution within the same X-ray energy range as with the conventional device 101.

On the other hand, the signal amplification factor $G_B$ of the preamplifier 41B is set to a larger signal amplification factor than $G_A$, which improves the S/N ratio but may cause the A/D converter 43 to saturate when the preamplifier 41B is selected for an X-ray fluorescence analysis within a large X-ray energy range (e.g., 20 KeV or higher).

Note that the specific signal amplification factor in this example is set to "×1" for the signal amplification factor $G_A$ of the preamplifier 41A and "×2" for the signal amplification factor $G_B$ of the preamplifier 41B.

Before starting the analysis, the energy range of the fluorescent X-rays to be analyzed is set from the input unit 51. Specifically, it is configured such that either "0-20 eV" or "0-40 eV" can be selectively set as the energy range. Note that it is also configured such that an arbitrary energy range can be set.

The CPU 50 is similar to the CPU 150 of the conventional device in that it controls the X-ray tube 10, the detector 30, the signal processing unit 160, etc., but is configured to read the maximum energy from the set fluorescence X-ray energy range set from the input unit 51 and select either one of the preamplifiers 41A or 41B based on this value.

That is, when the maximum energy to be analyzed is 20 KeV or less, the preamplifier 41B is selected, and when the maximum energy is 40 KeV or greater than 20 KeV, the preamplifier 41A is selected. The CPU 50 performs the switching of the switch 35 so that the signal from the detector 30 is sent to the selected preamplifier 41A or 41B.

Figure 2:
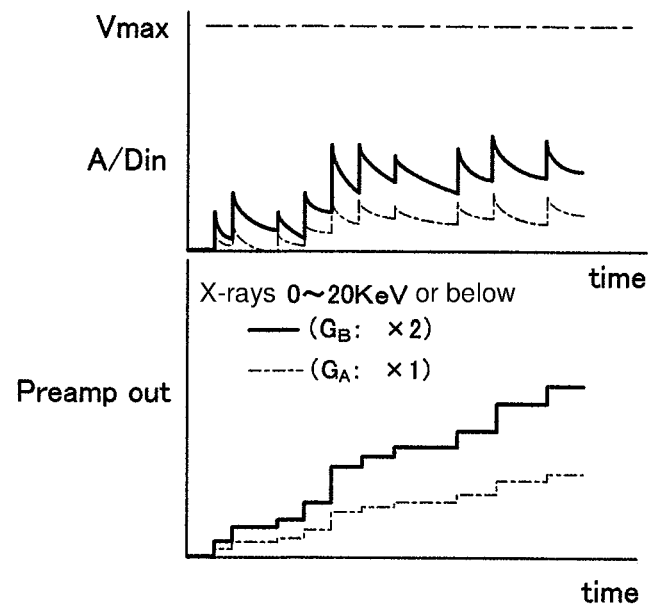
FIG. 2 is a waveform diagram showing the staircase wave signals obtained when amplified by two preamplifiers with different signal amplification factors $G_A(\times 1)$ and $G_B(\times 2)$ in a fluorescence X-ray analysis with small X-ray energy, and the differential signals to be input to the A/D converter.

FIG. 2 is a waveform diagram showing the staircase wave signals obtained when amplified by two preamplifiers with different signal amplification factors $G_A(\times 1)$ and $G_B(\times 2)$ and the differential signal to be input to the A/D converter in a fluorescence X-ray analysis for small X-ray energy. In the figure, the thin single-dotted chain line shows the staircase wave signal and the differential wave signal amplified by the preamplifier 41A whose signal amplification factor $G_A$ is "×1," and the thick solid line shows the staircase wave signal and the differential wave signal amplified by the preamplifier 41B whose signal amplification factor $G_A$ is "×2."

When performing a fluorescence X-ray analysis in the 0-20 KeV range, the energy of each individual incident X-ray is small. In this case, the differential wave signal (A/Din) input to the A/D converter 43 during the analysis will not exceed the maximum input voltage (Vmax) of the A/D converter 43 regardless of whether the preamplifier 41A with the signal amplification factor $G_A$ (×1) or the preamplifier 41B with the signal amplification factor $G_A$ (×2) is used to amplitude the signal. And since the preamplifier 41B can obtain a differential wave signal with a larger amplitude, the S/N ratio can be improved and the energy resolution can be improved by performing the switching operation of the switch 35 so that the signal from the detector 30 is sent to the preamplifier 41B (signal amplification factor $G_B$ is "×2.")

Figure 3:
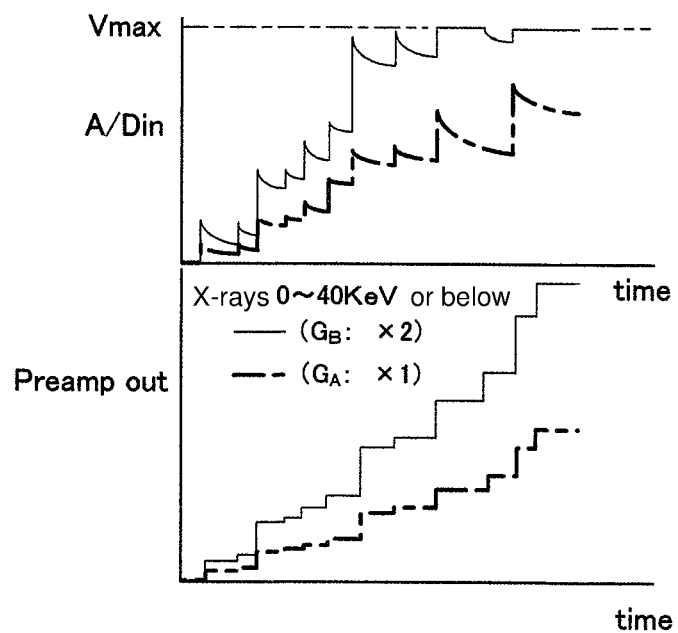
FIG. 3 is a waveform diagram showing the staircase wave signals obtained when amplified by two preamplifiers with different signal amplification factors $G_A(\times 1)$ and $G_B(\times 2)$ in a fluorescence X-ray analysis with large X-ray energy, and the differential signals to be input to the A/D converter.

FIG. 3 is a waveform diagram showing the staircase wave signals obtained when amplified by two preamplifiers with different signal amplification factors $G_A$(×1) and $G_B$(×2) in a fluorescence X-ray analysis for large X-ray energy and the differential signal to be input to the A/D converter. In the figure, the thick single-dotted chain line shows the staircase wave signal and the differential wave signal amplified by the preamplifier 41A whose signal amplification factor $G_A$ is "×1," and the thin solid line shows the staircase wave signal and the differential wave signal amplified by the preamplifier 41B whose signal amplification factor $G_A$ is "×2."

When conducting a fluorescent X-ray analysis from 0-40 KeV, i.e., when performing an analysis in which the maximum energy exceeds 20 KeV, there is a case in which the energy of each individual incident X-ray is large, and when amplified by the preamplifier 41B with a large signal amplification factor, there is a case in which the differential wave signal input to the A/D converter 43 during the analysis (A/Din) exceeds the maximum input voltage (Vmax) of the A/D converter. Therefore, by performing the switching operation of the switch 35 so that the signal from the detector 30 is sent to the preamplifier 41A (with a signal amplification factor of "×1"), the analysis can be performed in such a way that the A/D converter 43 is less likely to be saturated.

Although the embodiments in which the preamplifiers with two different signal amplification factors are switched are described above, three or more preamplifiers with different signal amplification factors may be switched based on the maximum energy of the fluorescent X-rays to be analyzed.

Further, in this embodiment, although the peak detection was performed by converting the signal into a trapezoidal waveform digital signal by the signal processing unit, the differential wave digital signal sent from the A/D converter 43 may be digitally converting into other waveforms, such as, e.g., a triangular waveform, to perform the peak detection.

Industrial Availability

The present invention can be applied to an energy dispersive type of fluorescence X-ray analyzer.

DESCRIPTION OF REFERENCE SYMBOLS

10: X-ray tube
30: Energy dispersive type spectrometer (detector)
35: Switch
41A, 41B: Preamplifier
42: Differentiating circuit
43: A/D converter
50: CPU
51: Input unit
61: Waveform conversion digital filter
62: Peak detection unit
63: Histogram memory
160: Signal processing unit

The invention claimed is:

1. An X-ray fluorescence analyzer comprising:
a detector configured to detect fluorescent X-rays emitted from a sample irradiated with excitation X-rays;
preamplifiers each configured to amplify a detection signal from the detector into a staircase wave signal; and
a differentiating circuit configured to convert the staircase wave signal into a differential wave signal;
an A/D converter configured to convert the differential wave signal into a digital signal;
a signal processing unit configured to detect a peak value from the digital signal, discriminate and count the peak value, and generate a histogram; and
an input unit configured to set an energy range of fluorescent X-rays to be analyzed,
wherein an energy spectrum in the set energy range is generated based on the histogram,
wherein the preamplifiers are different in an amplification factor and arranged in a switchable manner, and
wherein any one of the preamplifiers is automatically selected based on maximum energy in the set energy range.

2. The X-ray fluorescence analyzer as recited in claim 1, wherein the maximum energy in the set energy range of the fluorescent X-rays includes 40 KeV and 20 KeV.

* * * * *